United States Patent
Nakagawa

(10) Patent No.: US 8,742,730 B2
(45) Date of Patent: Jun. 3, 2014

(54) CHARGING CIRCUIT

(75) Inventor: Shinichi Nakagawa, Kasugai (JP)

(73) Assignee: Spansion LLC, Sunnyvale, CA (US)

( * ) Notice: Subject to any disclaimer, the term of this patent is extended or adjusted under 35 U.S.C. 154(b) by 250 days.

(21) Appl. No.: 12/708,332

(22) Filed: Feb. 18, 2010

(65) Prior Publication Data

US 2010/0141218 A1 Jun. 10, 2010

Related U.S. Application Data

(63) Continuation of application No. PCT/JP2007/067189, filed on Sep. 4, 2007.

(51) Int. Cl.
*H02J 7/00* (2006.01)

(52) U.S. Cl.
USPC .......................... 320/160; 320/157; 320/164

(58) Field of Classification Search
USPC ................. 320/134, 157, 160, 162, 164, 165; 324/433
See application file for complete search history.

(56) References Cited

U.S. PATENT DOCUMENTS

| | | | |
|---|---|---|---|
| 5,710,506 A * | 1/1998 | Broell et al. | 320/145 |
| 2002/0109506 A1* | 8/2002 | Kawakami et al. | 324/522 |
| 2005/0017676 A1* | 1/2005 | Takimoto et al. | 320/107 |

FOREIGN PATENT DOCUMENTS

| | | |
|---|---|---|
| JP | 9-247868 A | 9/1997 |
| JP | 2002-335307 A | 11/2002 |
| JP | 2005-012931 A | 1/2005 |
| JP | 2005-253128 A | 9/2005 |
| JP | 2006-254612 A | 9/2006 |

OTHER PUBLICATIONS

English-Language Abstract for Japanese Patent Publication No. 2002-335307 A, published Nov. 22, 2002; 1 page.
International Search Report directed to related International Patent Application No. PCT/JP2007/067189, mailed Oct. 9, 2007; 2 pages.
International Preliminary Search Report and Written Opinion of the International Searching Authority directed to related International Patent Application No. PCT/JP2007/067189, issued Mar. 30, 2010; 4 pages.

* cited by examiner

*Primary Examiner* — Edward Tso
*Assistant Examiner* — Aaron Piggush
(74) *Attorney, Agent, or Firm* — Sterne, Kessler, Goldstein & Fox P.L.L.C.

(57) ABSTRACT

A charging circuit that prevents a system abnormality caused by removal of a battery. The charging circuit includes a constant voltage charge controller which detects charge voltage and performs a constant voltage charging operation. A constant current charge controller detects charge current and performs a constant current charging operation. A controller controls the constant voltage charge controller to perform the constant voltage charging operation during a period from when the charge voltage reaches a fully charged voltage to when the charge current decreases to a charge completion current. The controller suspends charging the battery when the constant voltage charging operation is being performed and detects whether or not the battery is coupled to the charging circuit based on the charge voltage during the charging suspension.

16 Claims, 4 Drawing Sheets

CHARGING CIRCUIT

This application is a continuing application, filed under 35 U.S.C. §111(a), of International Application PCT/JP2007/067189, filed Sep. 4, 2007.

FIELD

The present embodiment relates to a charging circuit for charging a battery.

BACKGROUND

In electronic equipment that operates using a battery as a power supply, to ensure stable power, a charging circuit charges the battery with power supplied from an AC adapter or a USB power supply. Further, the battery and charging circuit both function as a power supply. In such electronic equipment, a system load must be stably operated by the charging circuit and battery.

FIG. 5 illustrates a conventional charging circuit. The charging circuit 1 is supplied with power from a power supply 2, which is a power supply device such as an AC adapter or a USB power supply. The charging circuit 1 has an output terminal To coupled to a battery 3 and a system load 4 via a current detection resistor R1. The battery 3 is supplied with charge voltage and charge current from the output terminal To. The system load 4 uses the battery 3 and the charging circuit 1 as a power supply.

The current detection resistance R1 has two terminals coupled to input terminals Ti1 and Ti2 of the charging circuit 1. Accordingly, the input terminal Ti2 is supplied with charge voltage Vbat from the battery 3, and the input terminals Ti1 and Ti2 are supplied with the voltage between the two terminals of the current detection resistor R1.

In the charging circuit 1, the input terminals Ti1 and Ti2 are coupled to two input terminals of a current detection amplifier 5. The current detection amplifier 5 amplifies the potential difference between the two terminals of the current detection resistor R1 and supplies an output voltage, which indicates the amplification result, to a negative input terminal of a constant current control amplifier 6.

The constant current control amplifier 6 has a positive input terminal supplied with a reference voltage Vs. Further, the constant current control amplifier 6 provides a drive circuit 7 with an output signal that is in accordance with the potential difference between the reference voltage Vs and the output voltage of the current detection amplifier 5.

The input terminal Ti2 is further coupled to ground GND via resistors R2 and R3. Voltage at node N10 between the resistors R2 and R3 is supplied to a negative input terminal of a constant voltage control amplifier 8. The constant current control amplifier 6 has a positive input terminal supplied with the reference voltage Vs. The constant voltage control amplifier 8 provides the drive circuit 7 with an output signal that is in accordance with the potential difference between the reference voltage Vs and the voltage at node N10.

The drive circuit 7 performs a constant voltage output operation or a constant current operation based on the output signal of the constant current control amplifier 6 and the output signal of the constant voltage control amplifier 7. The output signal of the drive circuit 7 is provided to the output terminal To.

Based on the operational states of the constant current control amplifier 6 and constant voltage control amplifier 8, an operation detector 9 detects whether or not the drive circuit 7 is performing a constant current output operation or a constant voltage output operation and provides its detection signal to a sequence controller 10.

The sequence controller 10 sequence-controls the operation of each of the constant current control amplifier 6 and the constant voltage control amplifier 8 based on the detection signal of the operation detector 9.

The operation for charging the battery 3 with the above-described charging circuit 1 will now be described with reference to FIGS. 3 and 4. FIG. 3 illustrates the charge voltage and the charge current in relation with the elapsed time for a case in which the time desired for the battery voltage (charge voltage) to reach 4.2 V from a fully discharged state is 870 minutes. FIG. 4 illustrates the relationship between the charge voltage and the charge current for this case.

When the battery 3 is in a discharged state and the charging circuit 1 performs a charging operation, the drive circuit 7 supplies a short circuit battery current Ishort, which is a very small constant current, and charging is performed until the charge voltage Vbat reaches a short circuit battery voltage Vshort of 2 V.

The charging is continued with a preliminary charge current of approximately 100 mA. When the charge voltage Vbat reaches a preliminary charge voltage of a little less than 3 V after about 30 minutes, a charge current Ichg, which is a constant current of 450 mA, is supplied to the battery 3 to perform fast charging.

When the charge voltage Vbat reaches the fully charged voltage Vreg of 4.2 V, the charging circuit 1 starts a constant voltage charging operation to gradually decrease the charge current Ichg to a charge completion current Itaper (fully charged state) of 100 mA.

When the system load 4 is driven and the consumption current of the system load 4 is greater than the output current of the drive circuit 7, the lacking current is supplied from the battery 3 to the system load 4. When the power supply 2 is not coupled to the charging circuit 1, the battery 3 supplies the consumption current of the system load 4.

When the system load 4 is supplied with consumption current from the battery 3 in a state coupled to the power supply 2, the charge voltage Vbat decreases from the fully charged voltage Vref, and the charging circuit 1 shifts to a constant current charging operation that uses a constant charge current Ichg of 450 mA. Then, the charge current Ichg is used to supply the system load 4 with consumption current, and the battery 3 is charged with the surplus current obtained by subtracting the consumption current from the charge current Ichg.

Normally, the charge current Ichg of the charging circuit 1 is preferably set to be greater than the maximum consumption current of the system load 4. This allows the system load 4 to be stably supplied with consumption current from the charging circuit 1 even if the battery 3 is removed from the charging circuit 1 (i.e., system load 4).

However, for example, when product development of a power supply IC including a charging circuit is carried out in parallel with product development of a system device, there may be case in which the charging current Ichg of the charging circuit 1 cannot be set to be greater than the maximum consumption current of the system load 4.

In such a case, when the system load 4 operates in a state in which the battery 3 is removed and the consumption current becomes 100 mA, the charging circuit 1 performs the constant voltage control operation with the output voltage of 4.2 V. As the consumption current of the system load 4 increases and the voltage at the input terminal Ti2 decreases, the charging circuit 1 outputs the charge current Ichg of 450 mA. Subsequently, the charging circuit repeats the constant voltage control state and the constant current control state in accordance with changes in the consumption current.

When the consumption current of the system load 4 exceeds the charge current Ichg of the charging circuit 1, a system abnormality may occur.

SUMMARY

According to an aspect of the embodiment, a charging circuit that charges a battery with charge voltage and charge current includes a constant voltage charge controller which detects the charge voltage and performs a constant voltage charging operation, a constant current charge controller which detects the charge current and performs a constant current charging operation, and a controller which controls the constant voltage charge controller to perform the constant voltage charging operation during a period from when the charge voltage reaches a substantially fully charged voltage to when the charge current decreases to a charge completion current, wherein the controller suspends charging of the battery when the constant voltage charging operation is being performed and detects whether or not the battery is coupled to the charging circuit based on the charge voltage during the charging suspension.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DETAILED DESCRIPTION OF THE EMBODIMENTS

A charging circuit 11 according to one embodiment of the present invention will now be discussed with reference to the drawings.

Figure 1:
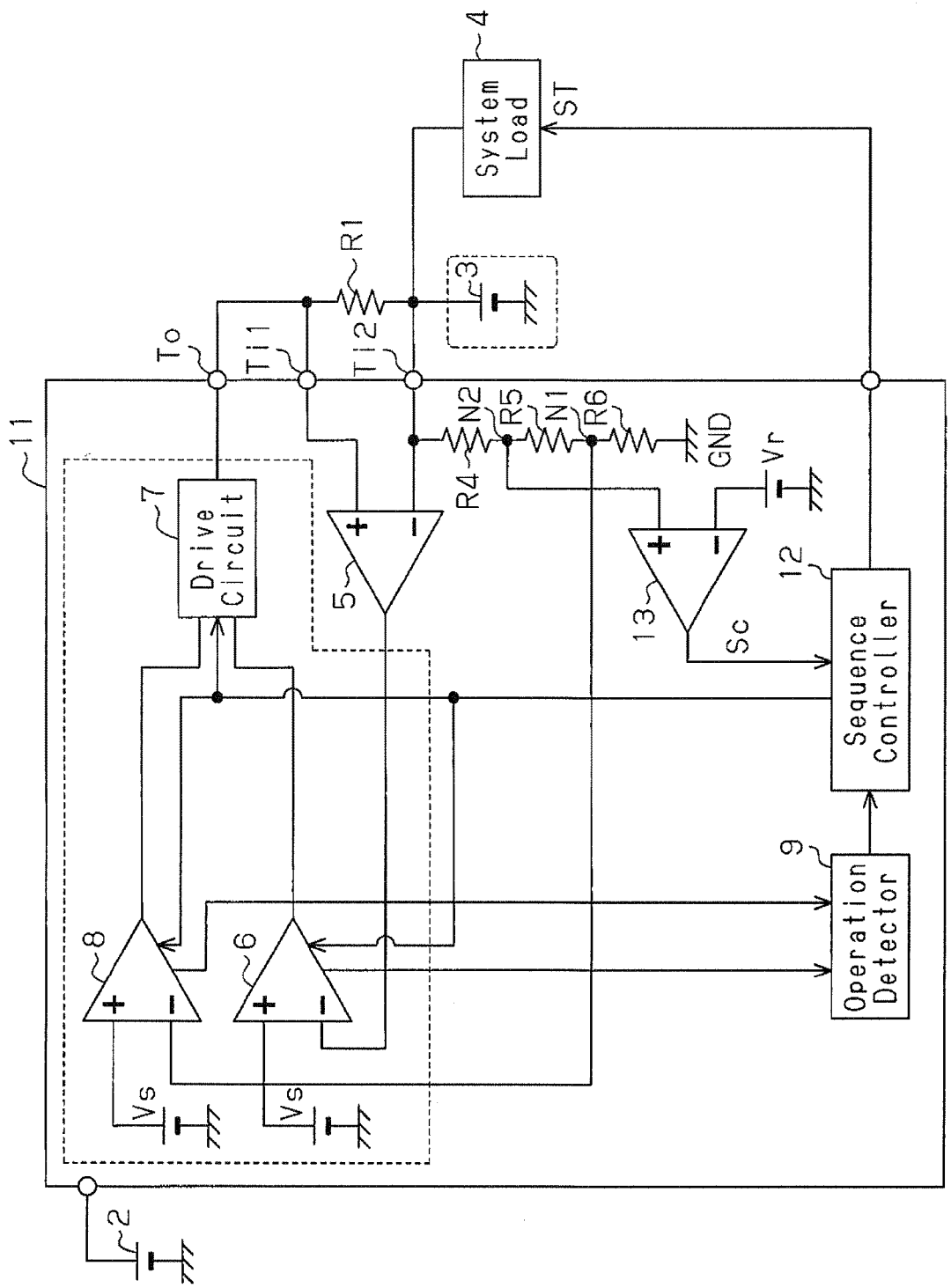
FIG. 1 is a schematic block diagram illustrating a charging circuit according to one embodiment of the present invention.

The charging circuit 11 illustrated in FIG. 1 includes a current detection amplifier 5, a constant current control amplifier 6, a drive circuit 7, a constant voltage control amplifier 8, and an operation detector 9, which are configured in the similar manner as the above-described conventional art example. The charging circuit 11 is operated when supplied with power from the power supply 2. In this embodiment, the constant current control amplifier 6 and the drive circuit 7 form a constant voltage charge controller, and the constant voltage control amplifier 8 and the operation detector 9 form a constant current charge controller.

The charging circuit 11 has an output terminal To coupled to a battery 3 and a system load 4. The battery 3 is supplied with charge current from the output terminal To. The system load 4 is supplied with operational current from the output terminal To.

A current detection resistance R1 has first and second terminals respectively coupled to input terminals Ti1 and Ti2 of the charging circuit 11. Accordingly, the input terminal Ti2 is supplied with charge voltage Vbat from the battery 3. The input terminals Ti1 and Ti2 are supplied with the potential difference between the first and second terminals of the current detection resistor R1 that is produced by the charge current that flows to the current detection resistor R1.

In the charging circuit 11, the input terminals Ti1 and Ti2 are respectively coupled to two input terminals of the current detection amplifier 5. The current detection amplifier 5 amplifies the potential difference between the input terminals Ti1 and Ti2 and supplies an output voltage, which indicates the amplification result, to a negative input terminal of the constant current control amplifier 6.

The constant current control amplifier 6 has a positive input terminal supplied with a reference voltage Vs. Further, the constant current control amplifier 6 provides the drive circuit 7 with an output signal that is in accordance with the potential difference between the reference voltage Vs and the output voltage of the current detection amplifier 5.

The input terminal Ti2 is coupled to ground GND via resistors R4, R5, and R6. Voltage at node N1 between the resistors R5 and R6 is supplied to a negative input terminal of the constant voltage control amplifier 8. The constant voltage control amplifier 8 has a positive input terminal supplied with the reference voltage Vs. The constant voltage control amplifier 8 provides the drive circuit 7 with an output signal that is in accordance with the potential difference between the reference voltage Vs and the voltage at node N1.

The drive circuit 7 performs a constant voltage output operation or a constant current operation based on the output signal of each of the constant current control amplifier 6, the constant voltage control amplifier 8, and a sequence controller 12. The output signal of the drive circuit 7 is provided to the output terminal To.

Based on the operational states of the constant current control amplifier 6 and constant voltage control amplifier 8, the operation detector 9 detects whether or not the drive circuit 7 is performing a constant current output operation or a constant voltage output operation and provides its detection signal to the sequence controller 12.

Figure 4:
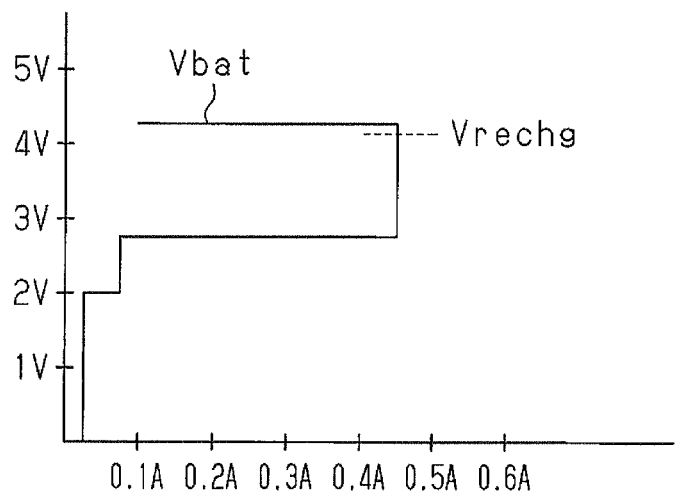
FIG. 4 is a behavioral diagram illustrating the charging of the charging circuit.
Figure 5:
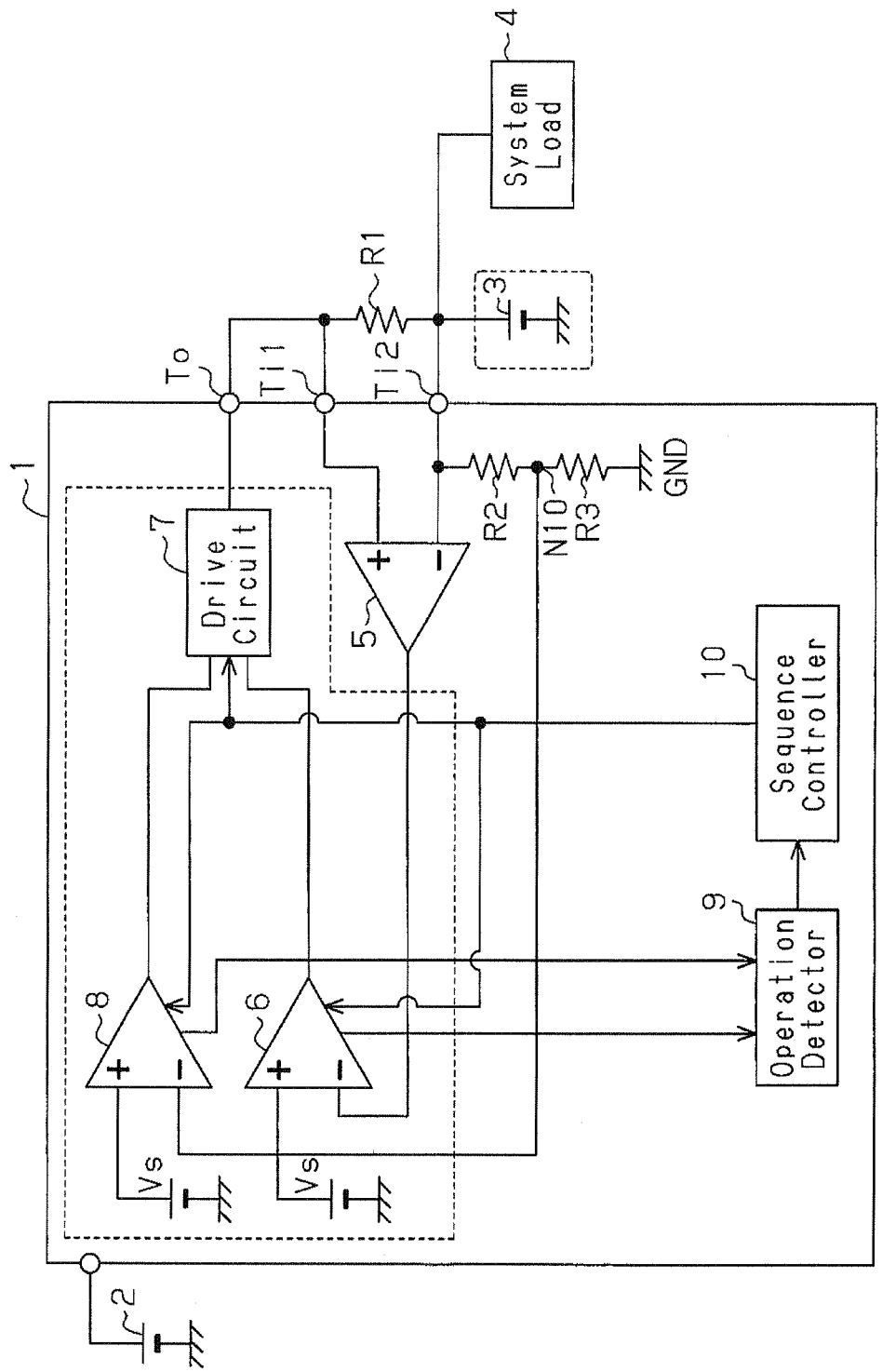
FIG. 5 is a schematic block diagram illustrating a conventional art charging circuit.

The voltage at node N2 between the resistors R4 and R5 is supplied to one of the input terminals of a comparator 13 and a reference voltage Vr is supplied to the other one of the input terminals of the comparator 13. The reference voltage Vr is set to be substantially equal to the voltage at node N2 when the charge voltage Vbat reaches a recharge voltage Vrechg. Referring to FIG. 4, the recharge voltage Vrechg is the voltage at which the battery 3 switches from constant voltage control as the charge voltage Vbat slightly decreases to constant current control.

Accordingly, when the charge voltage Vbat is greater than the recharge voltage Vrechg, the comparator 13 generates an output signal Sc having an H level. When the charge voltage Vbat is less than the recharge voltage Vrechg, the comparator 13 generates an output signal Sc having an L level.

The output signal Sc of the comparator 13 is provided to the sequence controller 12. Based on the detection signal of the operation detector 9 and the output signal Sc of the comparator 13, the sequence controller 12 sequence-controls the operation of each of the constant current control amplifier 6 and the constant voltage control amplifier 8. In this embodiment, the comparator 13 and sequence controller 12 form a controller of the present invention.

When the battery 3 is charged through constant voltage charging until reaching a substantially fully charged state (charge completion current Itaper), the sequence controller 12 functions to intermittently suspend the constant voltage charging operation (i.e., battery charging). When the charging is suspended and the output signal of the comparator 13 has an L level, the sequence controller 12 recognizes that the battery 3 has been removed from the charging circuit 11 (i.e., system load 4) and generates battery disconnected information. The sequence controller 12 holds the battery disconnected information and sends a suspension signal ST to the system load 4.

Figure 2:
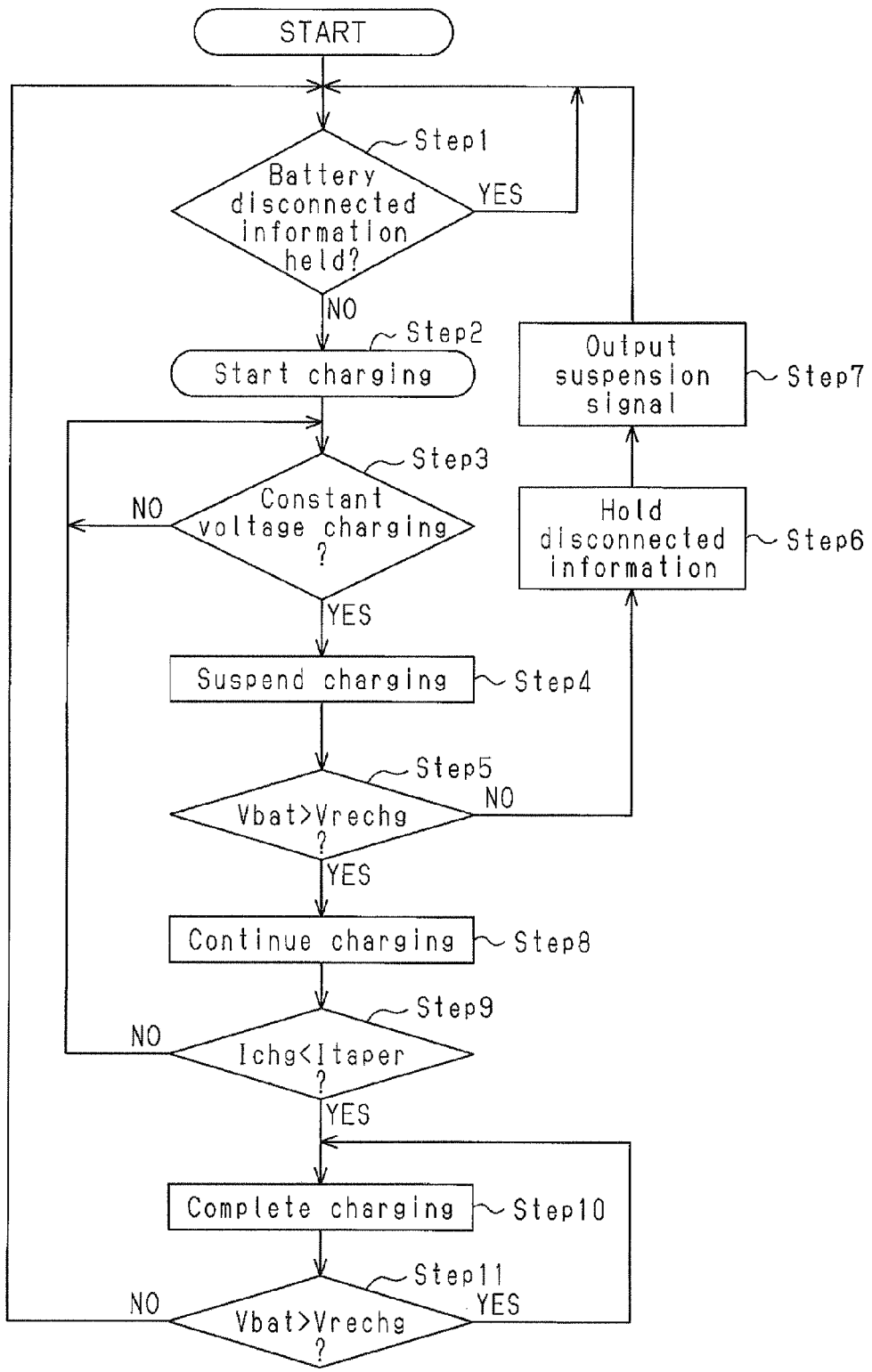
FIG. 2 is a flowchart illustrating the operation of the charging circuit illustrated in FIG. 1.

The operation of the charging circuit 11, which is described above, will now be discussed with reference to FIG. 2. When the power supply 2 starts supplying power to the charging circuit 11, a power supply IC, which includes the charging circuit 11 performs a power on reset operation, and the sequence controller 12 checks whether or not it is holding battery disconnected information (step 1). When the disconnected information is being held, the sequence controller 12 does not start a charging operation and remains in a standby state.

Figure 3:
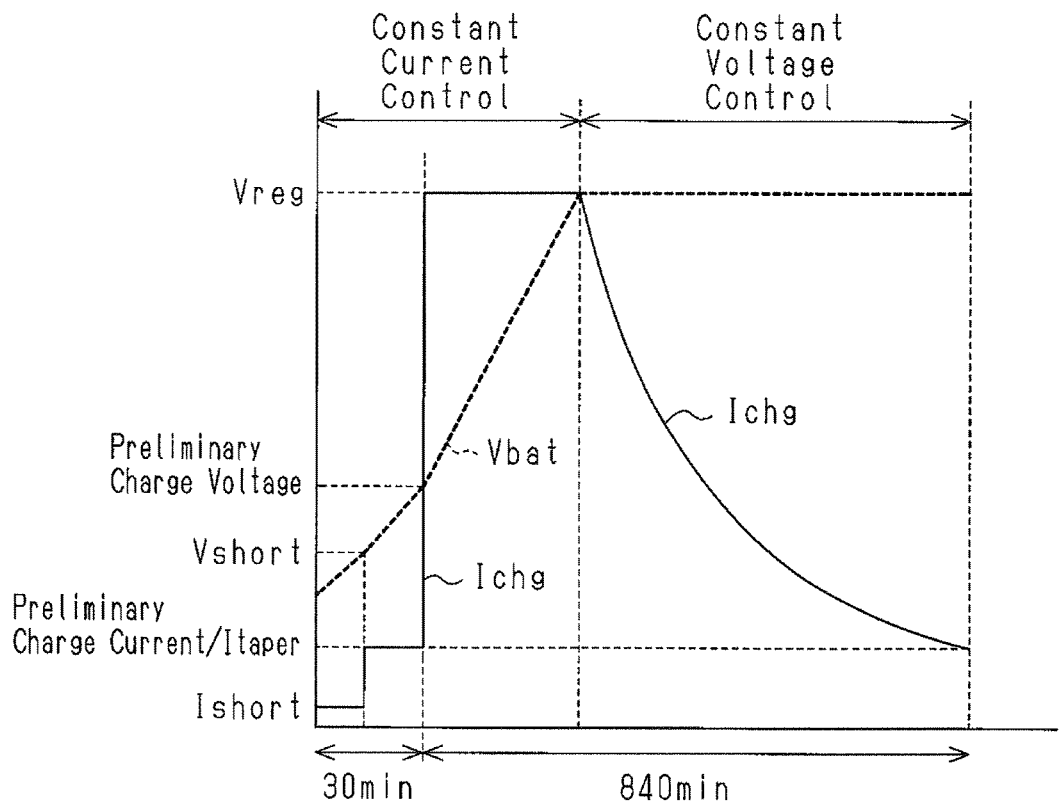
FIG. 3 is a behavioral diagram illustrating the charging of the charging circuit.

When the disconnected information is not being held in step 1, the sequence controller 12 proceeds to step 2 and starts the charging. Then, referring to FIGS. 3 and 4, the sequence controller 12 executes constant current control to perform preliminary charging and fast charging, which follows preliminary charging. Afterwards, the sequence controller 12 performs a constant current charging operation until the charge voltage Vbat reaches the fully charged voltage Vreg of 4.2 V.

When the charge voltage Vbat reaches 4.2 V, the sequence controller 12 switches to a constant voltage charging operation. When the constant voltage charging operation starts, the sequence controller 12 detects the operation (step S3) and suspends the charging operation (step 4).

Then, the sequence controller 12 determines whether or not the charging voltage Vbat is greater than the recharge voltage Vrechg, that is, whether the output signal of the comparator 13 has an H level or an L level (step 5). When the battery 3 has been removed, the voltage at the input terminal Ti2 decreases and the output signal of the comparator 13 has an L level.

When the charge voltage Vbat is less than the recharge voltage Vrechg, that is, when the output signal of the comparator 13 has an L level, the sequence controller 12 recognizes that the battery 3 has been removed and holds the disconnected information (step 6). Further, the sequence controller 12 sends the suspension signal ST to the system load 4 (step 7) and then proceeds to step 1.

When the charge voltage Vbat is greater than the recharge voltage Vrechg in step 5, the sequence controller 12 continues a low voltage charging operation (step 8). Then, the sequence controller 12 compares the present charge current Ichg with the charge completion current Itaper, which corresponds to the fully charged state (step 9). When the charge current Ichg is greater than or equal to the charge completion current Itaper, steps 3 to 8 are repeated.

In step 9, when the charge current Ichg becomes less than the charge completion current Itaper, the sequence controller 12 proceeds to step 10 and ends the charging operation. For example, the sequence controller 12 determines whether or not the charge current Ichg is less than the charge completion current Itaper based on the output signal of the operation detector 9. Then, the sequence controller 12 monitors the output signal of the comparator (step 11). When the charge voltage Vbat becomes less than the recharge voltage Vrechg, the sequence controller 12 returns to step 1 and repeats the operations described above.

The charging circuit 11 of this embodiment has the advantages described below.

(1) The sequence controller 12 detects removal of the battery 3 when the charging circuit 11 is performing a constant voltage charging operation.

(2) When detecting removal of the battery 3, the sequence controller 12 provides the system load 4 with the suspension signal ST. This prevents the occurrence of an abnormality on the system load 4 that would be caused by removal of the battery 3.

(3) When the charging circuit is performing a constant voltage charging operation, the sequence controller 12 periodically detects for removal of the battery 3 until the charge current Ichg becomes less than the charge completion current Itaper, that is, until the battery 3 becomes fully charged.

(4) The comparator 13 compares the voltage at node N2 with the reference voltage Vr. This allows for detection of whether or not the recharge voltage Vrechg of the battery 3 is greater than the charge voltage Vbat (voltage at the input terminal Ti2). Accordingly, the sequence controller 12 detects whether or not the battery 3 is removed based on the comparison result of the comparator 13.

In the embodiment described above, to optimize the charging operation while detecting whether or not the battery 3 has been removed from the charging circuit 11 (system load 4), the number of times charging is suspended during the constant voltage charging operation may be restricted to a given number. Alternatively, the timing may be varied at which charging is suspended again in step 4 after continuing charging in step 8.

All examples and conditional language recited herein are intended for pedagogical purposes to aid the reader in understanding the invention and the concepts contributed by the inventor to furthering the art, and are to be construed as being without limitation to such recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

The invention claimed is:

1. A charging circuit that charges a battery with charge voltage and charge current, the charging circuit comprising:
    a constant voltage charge controller which detects the charge voltage and performs a constant voltage charging operation;
    a constant current charge controller which detects the charge current and performs a constant current charging operation;
    a controller which controls the constant voltage charge controller to perform the constant voltage charging operation during a period from when the charge voltage reaches a substantially fully charged voltage to when the charge current decreases to a charge completion current; and
    a terminal coupled to the battery,
    wherein the controller suspends charging of the battery when the constant voltage charging operation is being performed and detects whether or not the battery is coupled to the charging circuit based on a voltage at the terminal during the charging suspension, and
    wherein the controller controls the constant voltage charge controller and the constant current charge controller to repetitively suspend and restart the charging a number of times when the constant voltage charging operation is being performed.

2. The charging circuit according to claim 1, wherein the controller includes:
a detection circuit which detects the voltage at the terminal and generates a detection result; and
a sequence controller coupled to the detection circuit, the constant voltage charge controller, and the constant current charge controller, the sequence controller determining whether or not the battery is coupled to the charging circuit based on the detection result of the detection circuit during the charging suspension.

3. The charging circuit according to claim 2, wherein the sequence controller controls the constant voltage charge controller to restart the constant voltage charging operation based on the detection result of the detection circuit after the charging suspension.

4. The charging circuit according to claim 2, wherein the battery is connectable to a load circuit;
the sequence controller generates a suspension signal for suspending operation of the load circuit when determining that the battery is disconnected from the charging circuit.

5. The charging circuit according to claim 2, wherein the detection circuit includes a comparator which compares a first voltage, proportional to the voltage at the terminal, with a reference voltage and generates the comparison result as the detection result.

6. The charging circuit according to claim 5, wherein the reference voltage is set to be substantially equal to the first voltage when the voltage at the terminal reaches a recharge voltage of the battery.

7. The charging circuit according to claim 6, wherein the recharging voltage is less than the charge voltage when the constant voltage charging operation is being performed and corresponds to the charge voltage when the constant voltage charging operation is switched to the constant current charging operation.

8. The charging circuit according to claim 2, wherein the sequence controller holds disconnected information when determining that the battery is disconnected from the charging circuit and waits before starting the charging of the battery based on the disconnected information.

9. A charging circuit that charges a battery with charge voltage and charge current, the charging circuit comprising:
a constant voltage charge controller which detects the charge voltage and performs a constant voltage charging operation;
a constant current charge controller which detects the charge current and performs a constant current charging operation;
a controller which controls the constant voltage charge controller to perform the constant voltage charging operation during a period from when the charge voltage reaches a substantially fully charged voltage to when the charge current decreases to a charge completion current; and
a terminal coupled to the battery,
wherein the controller suspends charging of the battery when the constant voltage charging operation is being performed and detects whether or not the battery is coupled to the charging circuit based on a voltage at the terminal during the charging suspension, and
wherein the controller repetitively detects whether or not the battery is coupled to the charging circuit, based on the voltage at the terminal during the charging suspension, when the constant voltage charging operation is being performed.

10. The charging circuit according to claim 9, wherein the controller includes:
a detection circuit which detects the voltage at the terminal and generates a detection result; and
a sequence controller coupled to the detection circuit, the constant voltage charge controller, and the constant current charge controller, the sequence controller determining whether or not the battery is coupled to the charging circuit based on the detection result of the detection circuit during the charging suspension.

11. The charging circuit according to claim 10, wherein the sequence controller controls the constant voltage charge controller to restart the constant voltage charging operation based on the detection result of the detection circuit after the charging suspension.

12. The charging circuit according to claim 10, wherein the battery is connectable to a load circuit;
the sequence controller generates a suspension signal for suspending operation of the load circuit when determining that the battery is disconnected from the charging circuit.

13. The charging circuit according to claim 10, wherein the detection circuit includes a comparator which compares a first voltage, proportional to the voltage at the terminal, with a reference voltage and generates the comparison result as the detection result.

14. The charging circuit according to claim 13, wherein the reference voltage is set to be substantially equal to the first voltage when the voltage at the terminal reaches a recharge voltage of the battery.

15. The charging circuit according to claim 14, wherein the recharging voltage is less than the charge voltage when the constant voltage charging operation is being performed and corresponds to the charge voltage when the constant voltage charging operation is switched to the constant current charging operation.

16. The charging circuit according to claim 10, wherein the sequence controller holds disconnected information when determining that the battery is disconnected from the charging circuit and waits before starting the charging of the battery based on the disconnected information.

\* \* \* \* \*